(12) United States Patent
Johnson et al.

(10) Patent No.: US 10,255,237 B2
(45) Date of Patent: Apr. 9, 2019

(54) ISOLATION LEVEL SUPPORT IN DISTRIBUTED DATABASE SYSTEM

(71) Applicant: SAP SE, Walldorf (DE)

(72) Inventors: Curtis Johnson, Bow, NH (US); Kyu Hwan Kim, Seoul (KR); Karim Khamis, Kitchener (CA); Kurt Deschler, Hudson, MA (US)

(73) Assignee: SAP SE, Walldorf (DE)

( * ) Notice: Subject to any disclaimer, the term of this patent is extended or adjusted under 35 U.S.C. 154(b) by 523 days.

(21) Appl. No.: 15/202,735

(22) Filed: Jul. 6, 2016

(65) Prior Publication Data
US 2018/0011895 A1    Jan. 11, 2018

(51) Int. Cl.
G06F 16/23    (2019.01)
G06F 16/951   (2019.01)
G06F 16/27    (2019.01)

(52) U.S. Cl.
CPC ...... *G06F 16/2379* (2019.01); *G06F 16/2365* (2019.01); *G06F 16/27* (2019.01); *G06F 16/951* (2019.01)

(58) Field of Classification Search
CPC .. G06F 16/2379; G06F 16/27; G06F 16/2365; G06F 16/951
USPC ........................................................ 707/703
See application file for complete search history.

(56) References Cited

U.S. PATENT DOCUMENTS

| | | | |
|---|---|---|---|
| 5,870,758 A * | 2/1999 | Bamford | G06F 16/2343 |
| 8,356,007 B2 * | 1/2013 | Larson | G06F 16/1865 |
| | | | 707/610 |
| 8,442,962 B2 * | 5/2013 | Lee | G06F 16/2365 |
| | | | 707/703 |
| 8,713,046 B2 * | 4/2014 | Vishnoi | G06F 16/2343 |
| | | | 707/770 |
| 9,600,500 B1 * | 3/2017 | Gupta | G06F 11/1471 |
| 2009/0070330 A1 * | 3/2009 | Hwang | G06F 16/2477 |
| 2011/0153566 A1 * | 6/2011 | Larson | G06F 9/466 |
| | | | 707/638 |

(Continued)

OTHER PUBLICATIONS

Lee, Juchang, et al., "SAP HANA Distributed In-Memory Database System: Transaction, Session, and Metadata Management", ICDE 2013, Brisbane, QLD, Australia, Apr. 8-12, 2013, pp. 1165-1173.*

(Continued)

*Primary Examiner* — Robert Stevens
(74) *Attorney, Agent, or Firm* — Buckley, Maschoff & Talwalkar LLC

(57) ABSTRACT

A system includes transmission of a first transaction identifier and a first commit identifier to a first data storage system, the first commit identifier identifying a first data snapshot of the first data storage system, transmission of a first query to the first data storage system, transmission of a first prepare instruction and the first transaction identifier to the first data storage system, determination that a first ready response has been received from the first data storage system in response to the first prepare instruction, transmission, in response to the determination, of a first commit instruction and the first transaction identifier to the first data storage system, and reception of a second commit identifier from the first data storage system, the second commit identifier identifying a second data snapshot of the first data storage system.

18 Claims, 5 Drawing Sheets

(56) References Cited

U.S. PATENT DOCUMENTS

2013/0124475 A1* 5/2013 Hildenbrand ....... G06F 16/2315
707/636
2016/0306709 A1* 10/2016 Shaull ................. G06F 11/1458
2017/0185636 A1* 6/2017 Horii ...................... G06F 16/22

OTHER PUBLICATIONS

Lin, Ye, et al., "Middleware based Data Replication providing Snapshot Isolation", SIGMOD 2005, Baltimore, MD, Jun. 14-16, 2005, pp. 419-430.*

Binnig, Carsten, et al., "Distributed snapshot isolation: global transactions pay globally, local transactions pay locally", The VLDB Journal, vol. 23, Issue 6, Dec. 2014, pp. 987-1011.*

Schenkel, Ralf, et al., "Federated Transaction Management with Snapshot Isolation", TDD '99, LNCS 1773, © Springer-Verlag Berlin 2000, pp. 1-25.*

Bieniusa, Annette, et al., "Consistency in Hindsight: A Fully Decentralized STM Algorithm", IPDPS 2010, Atlanta, GA, 2010, pp. 1-12.*

Bernabé-Gisbert, Josep M., et al., "Managing Multiple Isolation Levels in Middleware Database Replication Protocols", ISPA 2006, LNCS 4330, © Springer-Verlag Berlin 2006, pp. 511-523.*

Fekete, Alan, et al., "Making Snapshot Serializable", ACM Transactions on Database Systems, vol. 30, No. 2, Jun. 2005, pp. 492-528.*

Akkoorath, Deepthi Devaki, et al., "Cure: Strong semantics meets high availability and low latency", ICDCS 2016, Nara, Japan, Jun. 27-30, 2016, pp. 405-415.*

* cited by examiner

ISOLATION LEVEL SUPPORT IN DISTRIBUTED DATABASE SYSTEM

BACKGROUND

The two-phase commit protocol is used to coordinate distributed atomic transactions. In the first phase, a transaction manager instructs all transaction participants (e.g., distributed database nodes) to execute their respective portions of a transaction. In the second phase, and based on responses received from the transaction participants during the first phase, the transaction manager instructs the transaction participants to commit or to roll-back the transaction.

The two-phase commit protocol may provide transaction consistency within heterogenous distributed database systems, but does not support true isolation level semantics. For example, if a transaction is run at the SERIALIZABLE isolation level, table versions referenced by all transaction participants must be synchronized to the time at which the transaction began. Outside of a transaction, a statement which references tables on two distributed database nodes should reference versions of the tables as they existed at time the statement began.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
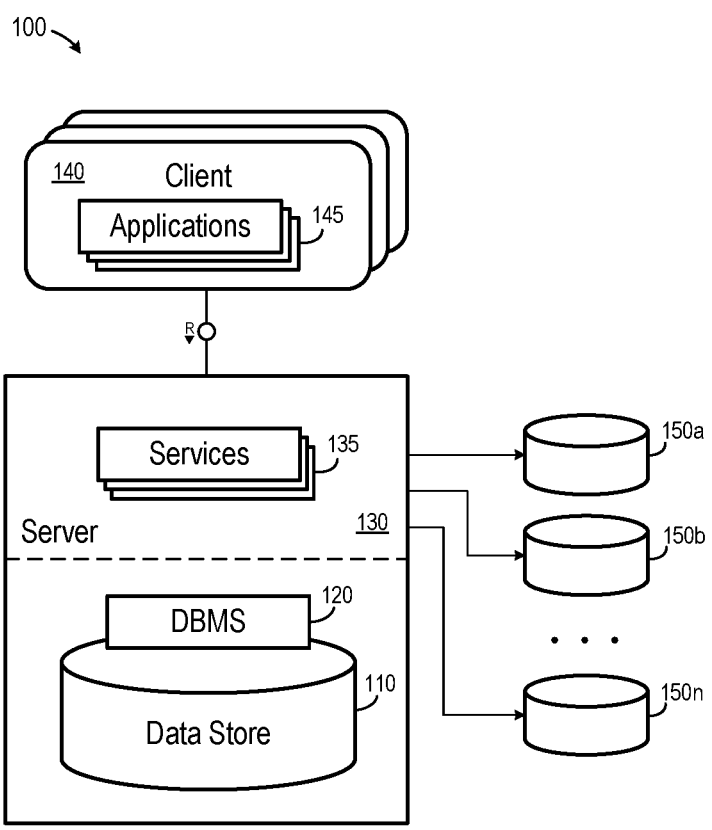
FIG. 1 is a block diagram of a system according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140, applications 145 and remote data storage 150a through 150n. Generally, services 135 executing within server 130 receive requests from applications 145 executing on clients 140 and provides results to applications 145 based on data stored within data store 110 and/or extended storage systems 150a through 150n.

More specifically, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 and/or extended storage systems 150a through 150n based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface and the application 145 passes a request based on the query to a transaction manager of services 135. The transaction manager synchronizes execution of the request via communication with DBMS 120 and/or extended storage systems 150a through 150n as will be described below. A response is then returned to the application 145.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the Web-Socket protocol over a single TCP connection.

One or more services 135 (e.g., a transaction manager and/or a data federation service) executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110 and/or extended storage systems 150a through 150n.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code. Each of extended storage systems 150a through 150n may comprise components to provide similar functions.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 and/or extended storage systems 150a through 150n may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 and/or extended storage systems 150a through 150n may be distributed among several relational databases, dimensional databases, and/or other data sources. Embodiments are not limited to any number or types of data sources.

In some embodiments, the data of data store 110 and/or extended storage systems 150a through 150n may comprise one or more of conventional tabular data, row-based data, column-based data, and object-based data. Moreover, the data may be indexed and/or selectively replicated in an index to allow fast searching and retrieval thereof. Data store 110 and/or extended storage systems 150a through 150n may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database). Each of extended storage systems 150a through 150n may comprise a single or distributed database, using cache memory and fixed disks for traditional data storage, but one or more of extended storage systems 150a through 150n may alternatively comprise an in-memory database according to some embodiments.

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Presentation of a user interface as described herein may comprise any degree or type of rendering, depending on the type of user interface code generated by server 130. For example, a client 140 may execute a Web Browser to request and receive a Web page (e.g., in HTML format) from application server 130 via HTTP, HTTPS, and/or Web-Socket, and may render and present the Web page according to known protocols. One or more of clients 140 may also or alternatively present user interfaces by executing a stand-alone executable file (e.g., an .exe file) or code (e.g., a JAVA applet) within a virtual machine. In another method, one or more of clients 140 execute applications 145 loaded from server 130, that receive data and metadata by requests to services 135 executed on the server 130. Data and metadata is processed by the applications 145 to render the user interface on the client 140.

Figure 2:
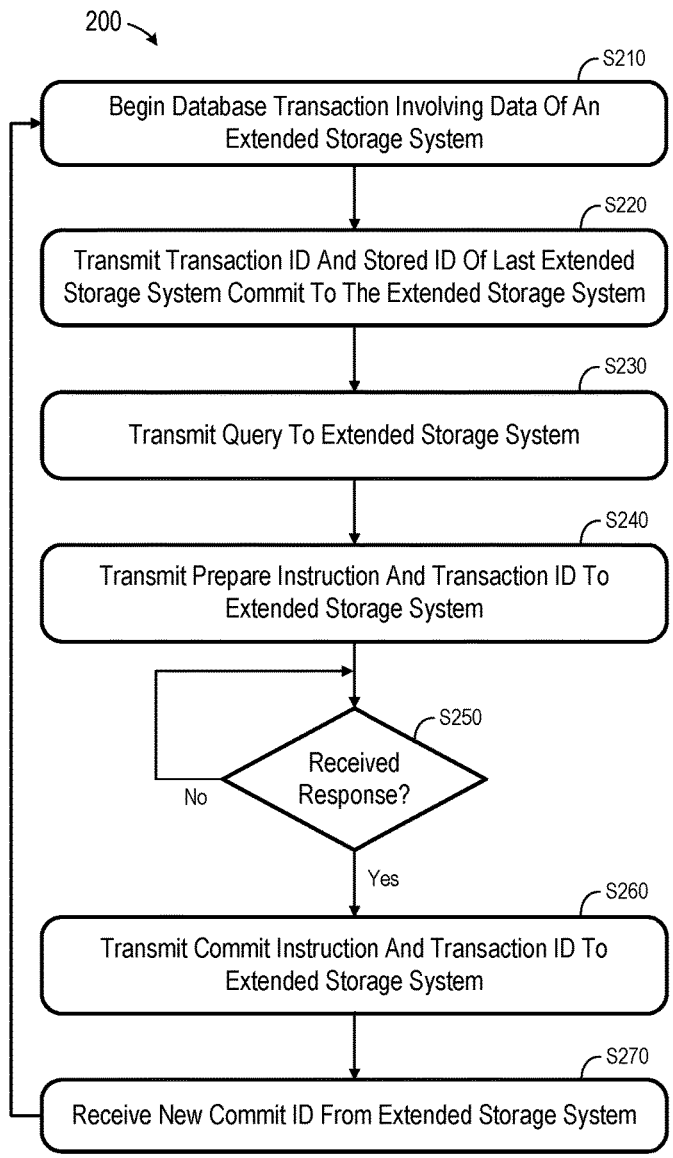
FIG. 2 is a flow diagram of a process according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a database transaction is begun at S210. The database transaction may be a transaction intended to service a received request as described above. The database transaction involves data of at least one of extended storage systems 150a through 150n. For example, the transaction may require updating data of or inserting data into one of extended storage systems 150a through 150n.

Prior to commencement of the transaction, it will be assumed that a transaction manager of server 120 stores a last commit identifier (ID) associated with each remote data storage 150a through 150n. The last commit ID of a remote data storage identifies a snapshot of the remote data storage. The snapshot represents a state of the data stored by the remote storage at a time of a last commit of the remote data storage.

Figure 4:
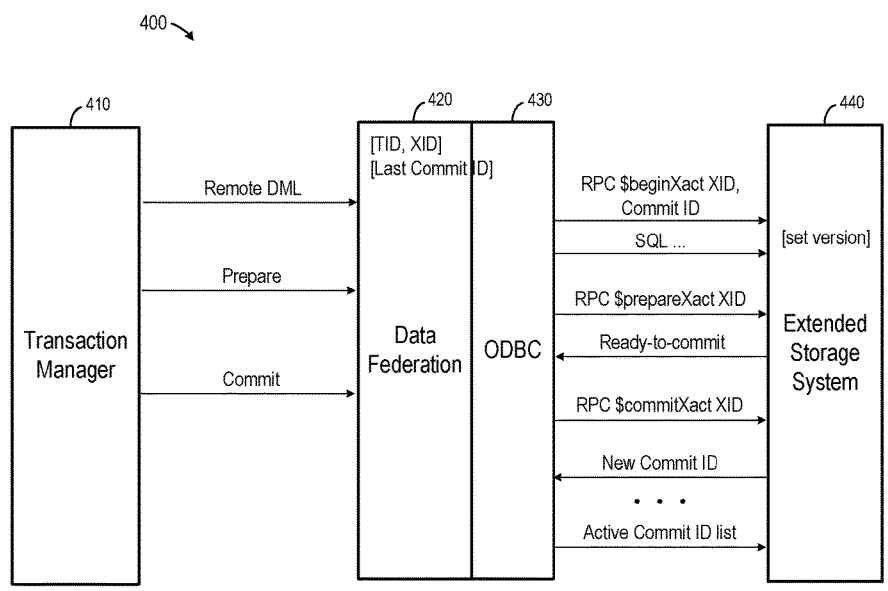
FIG. 4 is a block diagram of a system according to some embodiments.

At S220, a transaction ID corresponding to the transaction and the stored last commit ID are transmitted to the extended storage system. FIG. 4 illustrates communication according to some embodiments of process 200. FIG. 4 includes transaction manager 410 (e.g., of services 135), data federation 420 (e.g., of services 135), ODBC 430 to communicate with SQL-responsive data sources and extended storage system 440 (e.g., one of systems 150a through 150n).

As shown, data federation 420 stores an ID of the database transaction (i.e., TID), an ID of the portion of the database transaction associated with extended storage system 440 (i.e., XID), and a last commit ID associated with the particular extended storage system 440. As also shown, transaction manager 410 (e.g., of services 135) transmits a Data Manipulation Language (DML) request to data federation 420 (e.g., of services 135). The DML request is associated with the portion of the database transaction which relates to data stored within extended storage system 440. Then, at S220, the transaction ID XID and the last commit ID are transmitted to extended storage system 440 to indicate commencement of the portion of the transaction.

Next, at S230, a query is transmitted to the extended storage system. The query is based on the DML request and conforms to a query language supported by extended storage 440. For example, data federation 420 and ODBC 430 operate to create an appropriate SQL query in an SQL format supported by extended storage 440 and to transmit the SQL query according to a protocol supported by system 440.

Figure 3:
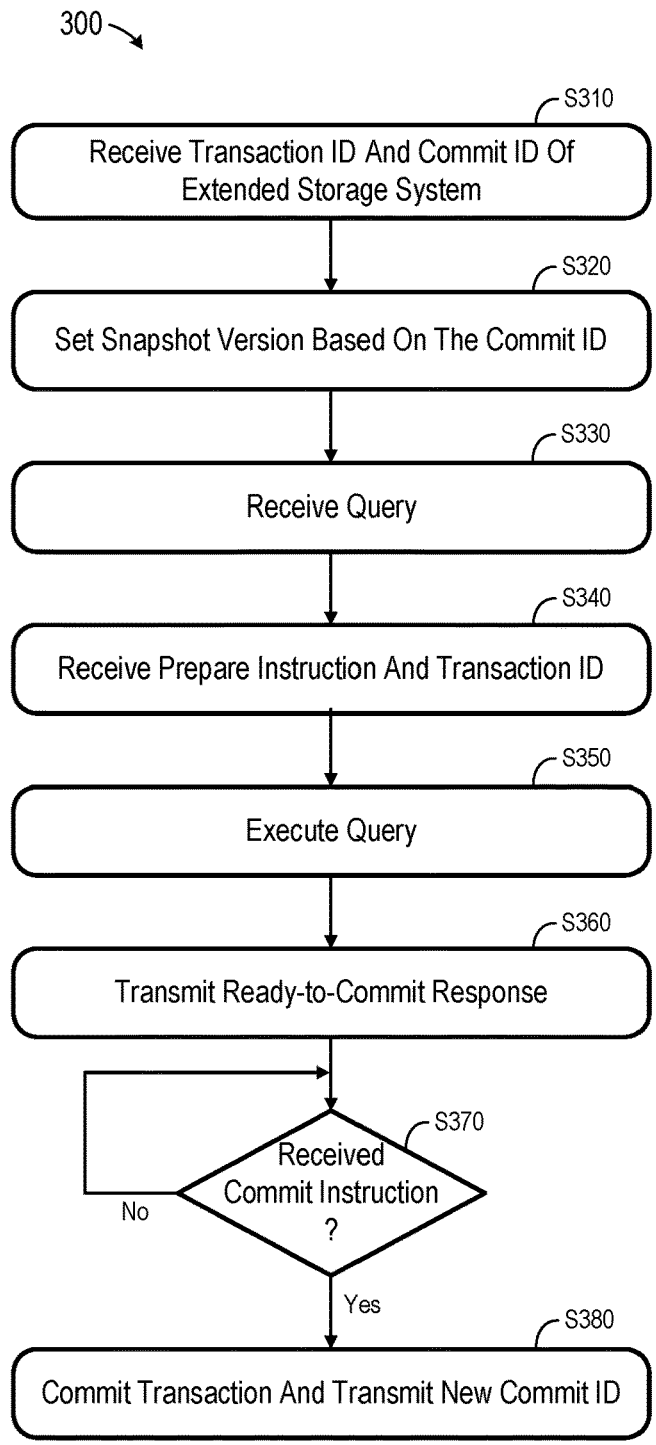
FIG. 3 is a flow diagram of a process according to some embodiments.

FIG. 3 is a flow diagram of process 300 executed by an extended storage system according to some embodiments. Process 300 is responsive to process 200 and may be executed by an extended storage system according to some embodiments. Process 300 may be executed in parallel by two or more of extended storage systems 150a through 150n. In this regard, transaction manager 410, data federation 420 and ODBC 430 may execute several instances of process 200 in parallel, with each instance corresponding to a particular portion of a database transaction (and its associated extended storage system).

For example, extended storage system 440 may receive the transaction ID XID and the commit ID from ODBC 430 at S310. Next, at S320, a snapshot version is set based on the commit ID. As described above, the commit ID corresponds to a snapshot version, which in turn corresponds to a state of the data of extended storage system 440 at a particular time. The query transmitted at S230 is received at S330 of process 300.

A prepare instruction is forwarded to the extended storage system at S240. Also transmitted is the transaction ID XID, to enable the extended storage system to associate the prepare instruction with the correct transaction portion and query. In this regard, extended storage system 440 may handle several transaction portions in parallel. Process 200 then pauses at S250 to await a response to the prepare instruction.

The extended storage system receives the prepare instruction and transaction ID XID a S340 and executes the query associated with the XID (and received at S330) at S350. The query is executed with respect to the snapshot version set at S320. After successful query execution, a "ready-to-commit" response is sent at S360 and flow pauses at S370 to await a commit instruction.

The response is received at S250. It will be assumed that a similar response is received from all other participants (e.g., other extended storage systems) in the transaction TID, in which case flow continues to S260. A commit instruction and transaction ID XID are transmitted, as shown in FIG. 4, to the extended storage system at S260.

Upon receipt of the commit instruction and transaction ID XID at S370, extended storage system 440 commits the associated transaction and transmits a new commit ID at S380. The new commit ID represents a snapshot version which in turn identifies a state of the data of extended storage system 440 after committing the current transaction portion. The new commit ID is received from extended storage system 440 at S270 and is stored in conjunction with an identifier of extended storage system 440. Flow then returns to S210, such that the newly-stored commit ID may be used to a snapshot version to use for a next portion of a transaction to be served by extended storage system 440.

If a positive response is not received from all transaction participants at S250 within a given timeframe, a "roll-back" instruction may be transmitted to all transaction participants at S260, in which case extended storage system 430 rolls back the transaction at S380 and new commit IDs are not received from any of the participants at S270.

Embodiments of the foregoing therefore address the potential time windows between the start of a local transaction and the start of an extended storage transaction during which data versions can diverge. Accordingly, isolation levels are supported regardless of whether data is located locally or in an extended storage system. Such advantages may be provided without requiring a client application to know the location of all data related to a transaction, or requiring a transaction to be started on all transaction participants regardless of whether they will each participate in the transaction.

Generally, the transaction manager may tell the remote system which commit ID should be active when either starting a transaction or running a statement outside of a transaction. In this regard, a request can be sent to a remote storage system outside of a transaction. For instance, if only a query was sent, it might not be necessary to start a transaction to execute that query. However, it may still be desirable to run the query using a specific commit ID. If so, the query request is preceded by a message to make a certain commit ID visible to the query.

The embodiments above allow a transaction manager to specify the commit ID to be used. In the isolation level SERIALIZABLE case, this commit ID is the CID that corresponds to the start of the transaction. However, if the isolation level were READ-COMMITTED, the CID specified by the transaction manager may be the most recent commit level. The transaction manager may therefore choose a commit ID level at S220 that is appropriate for the current isolation level.

FIG. 4 also shows transmission of an active commit ID list to extended storage system 440 according to some embodiments. Such a transmission may occur asynchronously and/or periodically. The list may include commit IDs for currently-running transactions which are associated with extended storage system 440. Upon receipt of such a list, extended storage system 440 may determine to maintain all snapshots associated with the listed commit IDs, and may also prune snapshot versions which are associated with times earlier than the time of an earliest commit ID of the list.

Figure 5:
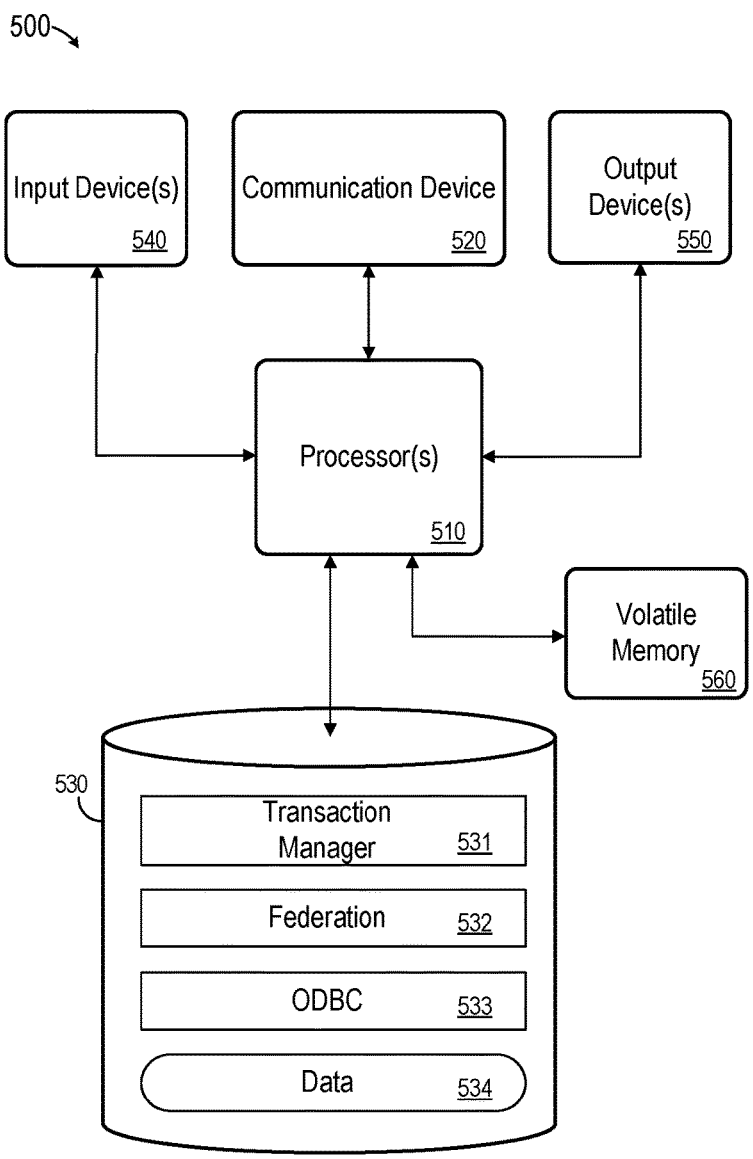
FIG. 5 is a block diagram of an apparatus according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of server 120 and data store 110 in some embodiments. Apparatus 500 may include other unshown elements according to some embodiments.

Apparatus 500 includes processor 510 operatively coupled to communication device 520, data storage device 530, one or more input devices 540, one or more output devices 550 and memory 560. Communication device 520 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Transaction manager 531, data federation 532 and ODBC 533 may each comprise program code executed by processor 510 to cause apparatus 500 to perform any one or more of the processes described herein. Embodiments are not limited to execution of these processes by a single apparatus.

Data 534 may include conventional database data as described above. As also described above, database data (either cached or a full database) may be stored in volatile memory such as memory 560. Data storage device 530 may also store data and other program code for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM)

storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a first computing system comprising:
      a first memory storing first processor-executable program code; and
      a first processor to execute the first processor-executable program code in order to cause the first computing system to:
         transmit a first transaction identifier and a first commit identifier to a first data storage system, the first commit identifier identifying a first data snapshot of the first data storage system;
         transmit a first query to the first data storage system;
         transmit a first prepare instruction and the first transaction identifier to the first data storage system;
         determine that a first ready response has been received from the first data storage system in response to the first prepare instruction;
         in response to the determination, transmit a first commit instruction and the first transaction identifier to the first data storage system; and
         receive a second commit identifier from the first data storage system, the second commit identifier identifying a second data snapshot of the first data storage system.

2. A system according to claim 1, a first processor to execute the first processor-executable program code in order to cause the first computing system to:
   transmit a second transaction identifier and the second commit identifier to the first data storage system, the second commit identifier identifying a second data snapshot of the first data storage system;
   transmit a second query to the first data storage system;
   transmit a second prepare instruction and the second transaction identifier to the first data storage system;
   determine that a second ready response has been received from the first data storage system in response to the second prepare instruction;
   in response to the determination that a second ready response has been received, transmit a second commit instruction and the second transaction identifier to the first data storage system; and
   receive a third commit identifier from the first data storage system, the third commit identifier identifying a third data snapshot of the first data storage system.

3. A system according to claim 2, further comprising the first data storage system computing system, the first data storage system comprising:
   a second memory storing second processor-executable program code; and
   a second processor to execute the second processor-executable program code in order to cause the second computing system to:
      receive the first transaction identifier and the first commit identifier from the first computing system;
      identify the first data snapshot identified by the first commit identifier;
      receive the first query from the first computing system;
      receive the first prepare instruction and the first transaction identifier from the first computing system;
      execute the first query based on the identified first data snapshot;
      transmit the first ready response to the first computing system;
      determine that the first commit instruction and the first transaction identifier have been received from the first computing system;
      in response to the determination that the first commit instruction and the first transaction identifier have been received, commit the first transaction and
   transmit the second commit identifier to the first computing system;
      receive the second transaction identifier and the second commit identifier from the first computing system;
      identify the second data snapshot identified by the second commit identifier;
      receive the second query from the first computing system;
      receive the second prepare instruction and second first transaction identifier from the first computing system;
      execute the second query based on the identified second data snapshot;
      transmit the second ready response to the first computing system;
      determine that the second commit instruction and the second transaction identifier have been received from the first computing system; and
      in response to the determination that the second commit instruction and the second transaction identifier have been received, commit the second transaction and transmit the third commit identifier to the first computing system.

4. A system according to claim 1, where the first transaction identifier identifies a first portion of a first database transaction, the first portion associated with data stored in the first data storage system, the first processor to execute the first processor-executable program code in order to cause the first computing system to:
   transmit a second transaction identifier and a third commit identifier to a second data storage system, the third commit identifier identifying a third data snapshot of the second data storage system, the second transaction identifier identifying a second portion of the first database transaction, the second portion associated with data stored in the second data storage system;
   transmit a second query to the second data storage system;
   transmit a second prepare instruction and the second transaction identifier to the second data storage system; and
   receive a fourth commit identifier from the second data storage system, the fourth commit identifier identifying a second data snapshot of the second data storage system,
   wherein determination that a first ready response has been received from the first data storage system in response to the first prepare instruction comprises determination that a second ready response has been received from the second data storage system in response to the second prepare instruction, and
   wherein transmission of the first commit instruction and the first transaction identifier to the first data storage system comprises transmission of the second commit instruction and the second transaction identifier to the second data storage.

5. A system according to claim 4, further comprising the first data storage system, the first data storage system comprising:
- a second memory storing second processor-executable program code; and
- a second processor to execute the second processor-executable program code in order to cause the second computing system to:
  - receive the first transaction identifier and the first commit identifier from the first computing system;
  - identify the first data snapshot identified by the first commit identifier;
  - receive the first query from the first computing system;
  - receive the first prepare instruction and the first transaction identifier from the first computing system;
  - execute the first query based on the identified first data snapshot;
  - transmit the first ready response to the first computing system;
  - determine that the first commit instruction and the first transaction identifier have been received from the first computing system; and
  - in response to the determination that the first commit instruction and the first transaction identifier have been received, commit the first transaction and transmit the second commit identifier to the first computing system; and the second data storage system comprising:
- a third memory storing third processor-executable program code; and
- a third processor to execute the third processor-executable program code in order to cause the third computing system to:
  - receive the second transaction identifier and the third commit identifier from the first computing system;
  - identify the second data snapshot identified by the third commit identifier;
  - receive the second query from the first computing system;
  - receive the second prepare instruction and the second transaction identifier from the first computing system;
  - execute the second query based on the identified third data snapshot;
  - transmit the second ready response to the first computing system;
  - determine that the second commit instruction and the second transaction identifier have been received from the first computing system; and
  - in response to the determination that the second commit instruction and the second transaction identifier have been received, commit the second transaction and transmit the fourth commit identifier to the first computing system.

6. A system according to claim 1, further comprising the first data storage system computing system, the first data storage system comprising:
- a second memory storing second processor-executable program code; and
- a second processor to execute the second processor-executable program code in order to cause the second computing system to:
  - receive the first transaction identifier and the first commit identifier from the first computing system;
  - identify the first data snapshot identified by the first commit identifier;
  - receive the first query from the first computing system;
  - receive the first prepare instruction and the first transaction identifier from the first computing system;
  - execute the first query based on the identified first data snapshot;
  - transmit the first ready response to the first computing system;
  - determine that the first commit instruction and the first transaction identifier have been received from the first computing system; and
  - in response to the determination that the first commit instruction and the first transaction identifier have been received, commit the first transaction and transmit the second commit identifier to the first computing system.

7. A computer-implemented method, comprising:
- transmitting a first transaction identifier and a first commit identifier to a first data storage system, the first commit identifier identifying a first data snapshot of the first data storage system;
- transmitting a first query to the first data storage system;
- transmitting a first prepare instruction and the first transaction identifier to the first data storage system;
- determining that a first ready response has been received from the first data storage system in response to the first prepare instruction;
- in response to the determination, transmitting a first commit instruction and the first transaction identifier to the first data storage system; and
- receiving a second commit identifier from the first data storage system, the second commit identifier identifying a second data snapshot of the first data storage system.

8. A method according to claim 7, further comprising:
- transmitting a second transaction identifier and the second commit identifier to the first data storage system, the second commit identifier identifying a second data snapshot of the first data storage system;
- transmitting a second query to the first data storage system;
- transmitting a second prepare instruction and the second transaction identifier to the first data storage system;
- determining that a second ready response has been received from the first data storage system in response to the second prepare instruction;
- in response to the determination that a second ready response has been received, transmitting a second commit instruction and the second transaction identifier to the first data storage system; and
- receiving a third commit identifier from the first data storage system, the third commit identifier identifying a third data snapshot of the first data storage system.

9. A method according to claim 8, further comprising:
- receiving the first transaction identifier and the first commit identifier from the first computing system;
- identifying the first data snapshot identified by the first commit identifier;
- receiving the first query from the first computing system;
- receiving the first prepare instruction and the first transaction identifier from the first computing system;
- executing the first query based on the identified first data snapshot;
- transmitting the first ready response to the first computing system;
- determining that the first commit instruction and the first transaction identifier have been received from the first computing system;

in response to the determination that the first commit instruction and the first transaction identifier have been received, committing the first transaction and transmitting the second commit identifier to the first computing system;

receiving the second transaction identifier and the second commit identifier from the first computing system;

identifying the second data snapshot identified by the second commit identifier;

receiving the second query from the first computing system;

receiving the second prepare instruction and second first transaction identifier from the first computing system;

executing the second query based on the identified second data snapshot;

transmitting the second ready response to the first computing system;

determining that the second commit instruction and the second transaction identifier have been received from the first computing system; and in response to the determination that the second commit instruction and the second transaction identifier have been received, committing the second transaction and transmitting the third commit identifier to the first computing system.

10. A method according to claim 7, where the first transaction identifier identifies a first portion of a first database transaction, the first portion associated with data stored in the first data storage system, the method further comprising:

transmitting a second transaction identifier and a third commit identifier to a second data storage system, the third commit identifier identifying a third data snapshot of the second data storage system, the second transaction identifier identifying a second portion of the first database transaction, the second portion associated with data stored in the second data storage system;

transmitting a second query to the second data storage system;

transmitting a second prepare instruction and the second transaction identifier to the second data storage system; and receiving a fourth commit identifier from the second data storage system, the fourth commit identifier identifying a second data snapshot of the second data storage system, wherein determination that a first ready response has been received from the first data storage system in response to the first prepare instruction comprises determination that a second ready response has been received from the second data storage system in response to the second prepare instruction, and wherein transmission of the first commit instruction and the first transaction identifier to the first data storage system comprises transmission of the second commit instruction and the second transaction identifier to the second data storage.

11. A method according to claim 10, further comprising:

receiving the first transaction identifier and the first commit identifier from the first computing system;

identifying the first data snapshot identified by the first commit identifier;

receiving the first query from the first computing system;

receiving the first prepare instruction and the first transaction identifier from the first computing system;

executing the first query based on the identified first data snapshot;

transmitting the first ready response to the first computing system;

determining that the first commit instruction and the first transaction identifier have been received from the first computing system;

in response to the determination that the first commit instruction and the first transaction identifier have been received, committing the first transaction and transmitting the second commit identifier to the first computing system;

receiving the second transaction identifier and the third commit identifier from the first computing system;

identifying the second data snapshot identified by the third commit identifier;

receiving the second query from the first computing system;

receiving the second prepare instruction and the second transaction identifier from the first computing system;

executing the second query based on the identified third data snapshot;

transmitting the second ready response to the first computing system;

determining that the second commit instruction and the second transaction identifier have been received from the first computing system; and in response to the determination that the second commit instruction and the second transaction identifier have been received, committing the second transaction and transmitting the fourth commit identifier to the first computing system.

12. A method according to claim 7, further comprising:

receiving the first transaction identifier and the first commit identifier from the first computing system;

identifying the first data snapshot identified by the first commit identifier;

receiving the first query from the first computing system;

receiving the first prepare instruction and the first transaction identifier from the first computing system;

executing the first query based on the identified first data snapshot;

transmitting the first ready response to the first computing system;

determining that the first commit instruction and the first transaction identifier have been received from the first computing system; and in response to the determination that the first commit instruction and the first transaction identifier have been received, committing the first transaction and transmitting the second commit identifier to the first computing system.

13. A non-transitory computer-readable medium storing program code, the program code executable to:

transmit a first transaction identifier and a first commit identifier to a first data storage system, the first commit identifier identifying a first data snapshot of the first data storage system;

transmit a first query to the first data storage system;

transmit a first prepare instruction and the first transaction identifier to the first data storage system;

determine that a first ready response has been received from the first data storage system in response to the first prepare instruction;

in response to the determination, transmit a first commit instruction and the first transaction identifier to the first data storage system; and receive a second commit identifier from the first data storage system, the second commit identifier identifying a second data snapshot of the first data storage system.

14. A medium according to claim 13, the program code further executable to:
transmit a second transaction identifier and the second commit identifier to the first data storage system, the second commit identifier identifying a second data snapshot of the first data storage system;
transmit a second query to the first data storage system;
transmit a second prepare instruction and the second transaction identifier to the first data storage system;
determine that a second ready response has been received from the first data storage system in response to the second prepare instruction;
in response to the determination that a second ready response has been received, transmit a second commit instruction and the second transaction identifier to the first data storage system; and
receive a third commit identifier from the first data storage system, the third commit identifier identifying a third data snapshot of the first data storage system.

15. A medium according to claim 14, the program code further executable to:
receive the first transaction identifier and the first commit identifier from the first computing system;
identify the first data snapshot identified by the first commit identifier;
receive the first query from the first computing system;
receive the first prepare instruction and the first transaction identifier from the first computing system;
execute the first query based on the identified first data snapshot;
transmit the first ready response to the first computing system;
determine that the first commit instruction and the first transaction identifier have been received from the first computing system;
in response to the determination that the first commit instruction and the first transaction identifier have been received, commit the first transaction and transmit the second commit identifier to the first computing system;
receive the second transaction identifier and the second commit identifier from the first computing system;
identify the second data snapshot identified by the second commit identifier;
receive the second query from the first computing system;
receive the second prepare instruction and second first transaction identifier from the first computing system;
execute the second query based on the identified second data snapshot;
transmit the second ready response to the first computing system;
determine that the second commit instruction and the second transaction identifier have been received from the first computing system; and
in response to the determination that the second commit instruction and the second transaction identifier have been received, commit the second transaction and transmit the third commit identifier to the first computing system.

16. A medium according to claim 13, where the first transaction identifier identifies a first portion of a first database transaction, the first portion associated with data stored in the first data storage system, the program code further executable to:

transmit a second transaction identifier and a third commit identifier to a second data storage system, the third commit identifier identifying a third data snapshot of the second data storage system, the second transaction identifier identifying a second portion of the first database transaction, the second portion associated with data stored in the second data storage system;
transmit a second query to the second data storage system;
transmit a second prepare instruction and the second transaction identifier to the second data storage system; and
receive a fourth commit identifier from the second data storage system, the fourth commit identifier identifying a second data snapshot of the second data storage system,
wherein determination that a first ready response has been received from the first data storage system in response to the first prepare instruction comprises determination that a second ready response has been received from the second data storage system in response to the second prepare instruction, and
wherein transmission of the first commit instruction and the first transaction identifier to the first data storage system comprises transmission of the second commit instruction and the second transaction identifier to the second data storage.

17. A medium according to claim 16, the program code further executable to:
receive the first transaction identifier and the first commit identifier from the first computing system;
identify the first data snapshot identified by the first commit identifier;
receive the first query from the first computing system;
receive the first prepare instruction and the first transaction identifier from the first computing system;
execute the first query based on the identified first data snapshot;
transmit the first ready response to the first computing system;
determine that the first commit instruction and the first transaction identifier have been received from the first computing system;
in response to the determination that the first commit instruction and the first transaction identifier have been received, commit the first transaction and transmit the second commit identifier to the first computing system;
receive the second transaction identifier and the third commit identifier from the first computing system;
identify the second data snapshot identified by the third commit identifier;
receive the second query from the first computing system;
receive the second prepare instruction and the second transaction identifier from the first computing system;
execute the second query based on the identified third data snapshot;
transmit the second ready response to the first computing system;
determine that the second commit instruction and the second transaction identifier have been received from the first computing system; and
in response to the determination that the second commit instruction and the second transaction identifier have been received, commit the second transaction and transmit the fourth commit identifier to the first computing system.

18. A medium according to claim 13, the program code further executable to:

receive the first transaction identifier and the first commit identifier from the first computing system;

identify the first data snapshot identified by the first commit identifier;

receive the first query from the first computing system;

receive the first prepare instruction and the first transaction identifier from the first computing system;

execute the first query based on the identified first data snapshot;

transmit the first ready response to the first computing system;

determine that the first commit instruction and the first transaction identifier have been received from the first computing system; and in response to the determination that the first commit instruction and the first transaction identifier have been received, commit the first transaction and transmit the second commit identifier to the first computing system.

* * * * *